United States Patent
Bergan et al.

(10) Patent No.: US 11,863,041 B2
(45) Date of Patent: Jan. 2, 2024

(54) DEVICES AND METHODS FOR CLEARING AND MOLECULAR LABELING OF INTACT TISSUES

(71) Applicant: University of Massachusetts, Boston, MA (US)

(72) Inventors: Joseph Fossland Bergan, Amherst, MA (US); Joseph Frank Dantas Dwyer, Sunderland, MA (US)

(73) Assignee: University of Massachusetts, Boston, MA (US)

( * ) Notice: Subject to any disclaimer, the term of this patent is extended or adjusted under 35 U.S.C. 154(b) by 1037 days.

(21) Appl. No.: 16/530,124

(22) Filed: Aug. 2, 2019

(65) Prior Publication Data
US 2020/0044550 A1    Feb. 6, 2020

Related U.S. Application Data (60) Provisional application No. 62/713,679, filed on Aug. 2, 2018.

(51) Int. Cl.
| | |
|---|---|
| *H02K 44/08* | (2006.01) |
| *H02K 44/12* | (2006.01) |
| *G01N 1/31* | (2006.01) |
| *G01N 1/34* | (2006.01) |

(52) U.S. Cl.
CPC ............ *H02K 44/085* (2013.01); *G01N 1/31* (2013.01); *G01N 1/34* (2013.01); *H02K 44/12* (2013.01)

(58) Field of Classification Search
CPC ............ G01N 1/31; G01N 1/34; H02K 44/12; H02K 44/085; H02K 2201/18
See application file for complete search history.

(56) References Cited

U.S. PATENT DOCUMENTS

| | | | |
|---|---|---|---|
| 2006/0068412 A1* | 3/2006 | Tang | B82Y 30/00 435/287.2 |
| 2007/0209941 A1* | 9/2007 | Holland | B01L 3/502784 204/601 |
| 2013/0280725 A1* | 10/2013 | Ismagilov | B01L 3/50273 435/6.12 |
| 2016/0263577 A1* | 9/2016 | Ismagilov | B01L 3/527 |
| 2018/0238830 A1* | 8/2018 | Fritsch | G01N 27/44786 |

FOREIGN PATENT DOCUMENTS

| | | | | |
|---|---|---|---|---|
| WO | WO-2013056182 A1 * | 4/2013 | | G01N 33/48721 |
| WO | WO-2018058085 A1 * | 3/2018 | | B01F 13/0059 |

OTHER PUBLICATIONS

Lee et al., ACT-PRESTO: Rapid and consistent tissue clearing and labeling method for 3-dimensional (3D) imaging, Jan. 11, 2016, Scientific Reports, pp. 1-13. (Year: 2016).*

* cited by examiner

*Primary Examiner* — Christine T Mui
*Assistant Examiner* — Kathryn Elizabeth Limbaugh
(74) *Attorney, Agent, or Firm* — Milstein Zhang & Wu LLC (57) ABSTRACT

The invention provides devices and methods for moving charged molecules into and out of tissue samples. This invention is particularly useful for removing endogenous heterogenous particles from tissue samples and for introducing exogenous charged molecules (e.g., antibodies, dyes) into tissue samples.

5 Claims, 6 Drawing Sheets

DEVICES AND METHODS FOR CLEARING AND MOLECULAR LABELING OF INTACT TISSUES

TECHNICAL FIELD OF THE INVENTION

The invention generally relates to systems and devices for biological sample preparation and analysis. More particularly, the invention relates to devices and methods useful for clearing and labeling tissue samples for imaging and analytical measurements.

BACKGROUND OF THE INVENTION

Understanding the structure and function of neural circuits relies on information at the level of single proteins in the context of the intact nervous system. The ability to investigate neural circuits at high resolution while maintaining their native framework represents an important step towards understanding the function of such circuits. Advances in microscopy and image analysis have created an environment where the capacity to investigate the 3-dimensional anatomy of intact biological structures is dictated primarily by the ability to produce high-quality samples. (Chung, et al. 2013 Nature, 497:332-337; Isogai, et al. 2017 Optimized Protocol for Imaging Cleared Neural Tissues Using Light Microscopy. In: Poulopoulos A. (eds) Synapse Development. Methods in Molecular Biology, vol. 1538. Humana Press, New York, NY; Menegas, et al. 2015 eLife, 4, e10032.)

There has been a concerted effort to develop effective methods to "clear" tissue to assist with microscopic investigation of intact samples. The capacity to study large (1 cm$^3$ or larger) biological samples with fluorescence microscopy is impeded by the scattering of light within the tissue, which causes most biological tissues to be opaque. Chemical strategies that render tissues transparent have existed for over a century, but early techniques tended to quench common fluorophores, making fluorescent imaging untenable. (Schultze, O. (1897). Über Herstellung and Conservirung durchsichtigen Embryonen zum Stadium der Skeletbildung. In Verhandlungen der Anatomischen Gesellschaft (Anatomischer Anzeiger), p. 3-5.) Newer strategies render large tissue samples virtually transparent by removing lipids and matching the refractive index of the remaining tissue while also preserving fluorescent molecular labels. (Chung, et al. 2013 Nature, 497:332-337; Hama, et al. 2011 Nature Neuroscience, 14:1481-1488; Lee, et. al. 2016 Scientific Reports, 6(1863); Pan, et al. 2016 Nature Methods 13:859-67; Susaki, et al. 2014 Cell, 157:726-739; Susaki, et al. 2015 Nature Protocols, 10:1709-27.) Such approaches have now been successfully applied to many tissue types and have proven powerful for investigating tissues like the nervous system for which biological function is dictated by anatomical relationships ranging in size from single proteins to the entire body. (Murray, et al. 2015 Cell, 163(6), 1500-1514; Chung, et al. 2013 Nature, 497:332-337; Hama, et al. 2011 Nature Neuroscience, 14:1481-1488; Lee, et al. 2018 Scientific Reports, 8, 6640; Pan, et al. 2016 Nature Methods 13:859-67; Susaki, et al. 2014 Cell, 157:726-739; Menegas, et al. 2015 eLife, 4, e10032.)

While antibody labeling is effective when used to label thinly sliced tissue, it has been difficult to implement in large tissue samples, primarily because the diffusion of molecular labels into large tissue samples can be impractically slow. Existing strategies use electrophoretic forces or chemically induce permeability to accelerate antibody penetration into tissue. (Chung, et al. 2013 Nature, 497:332-337; Kim, et al. 2015 PNAS, 112: E6274-83; Renier, et al. 2014 Cell, 159: 896-910; Renier, et al. 2016 Cell, 165:1789-1802; Susaki, et al. 2014 Cell, 157:726-739; Susaki, et al. 2015 Nature Protocols, 10:1709-27; Hama, et al. 2015 Nature Neuroscience, 18: 1518-1529.) While these approaches improve labeling speed, they require up to 2 weeks to complete a single label and often damage endogenous fluorescence (Renier, et al. 2014 Cell, 159:896-910; Susaki, et al. 2014 Cell, 157:726-739, Hama, et al. 2015 Nature Neuroscience, 18: 1518-1529.)

Techniques that render biological tissue transparent allow researchers to visualize deep structural elements in their native state. These techniques often present challenges including cost and durability of the device and necessary reagents.

A need exists for reliable, inexpensive, and easy to maintain devices and systems to render intact tissue samples transparent and to rapidly label biomarkers within these tissue samples.

SUMMARY OF THE INVENTION

The disclosed invention provides a novel approach to rendering opaque tissue samples transparent and rapidly labeling tissue samples, for example, with labeled antibodies for large volume fluorescence microscopy. A magnetohydrodynamic (MHD) force is employed to accelerate the removal of lipids from and the introduction of fluorescent antibody labels into tissue samples as large as an intact mouse brain. The disclosed invention enables high-resolution 3-dimensional anatomical analyses in intact tissues using fluorescence microscopy. MHD-accelerated clearing and antibody labeling are inexpensive, straightforward, and compatible with existing strategies for fluorescence microscopy that allow high-quality imaging of intact tissues.

New tissue clearing techniques, combined with fluorescent transgenic reporters and antibody labeling, allow unprecedented investigation of gene expression, neuronal connectivity, and functional anatomy in the brain. The MHD-accelerated protocol disclosed herein provides a simple, reliable and efficient method that facilitates microscopic investigation by rapidly clearing and labeling large tissue samples.

In one aspect, the invention generally relates to a magnetohydrodynamic system or device. The device comprises: at least one channel having space therein for holding an electrically conducting solution and a sample emerged therein; at least two electrodes creating an electric field within the channel; and a magnetic system creating a magnetic field within the channel and perpendicular to the electric field. The electric field and the magnetic field jointly induce charged particles in the sample and/or the electrically conducting solution to flow in a direction perpendicular to both the electric field and the magnetic field.

In another aspect, the invention generally relates to a method for moving charged particles in a biological sample. The method comprises: providing a sample submerged in a channel having an electrically conducting solution; applying an electric field within the channel; simultaneously applying a magnetic field within the channel and perpendicular to the electric field; and inducing the charged particles in the sample to flow in a direction perpendicular to both the electric field and the magnetic field.

BRIEF DESCRIPTION OF THE DRAWINGS

FIG. 1. Overview of MHD-accelerated clearing approach A) Steps required to effectively clear tissue of lipids. B)

CAD diagram showing the MHD-assisted clearing device. C) A photograph of the clearing device with tissue chamber exposed and arrows to show the location of the magnets and electrodes in the device. D) A cartoon showing the setup of the clearing device submerged in a container filled with detergent solution held at 37° C. Tissue was placed in the central chamber where MHD force (orange arrow) produced from the electrical and magnetic fields simultaneously circulate the buffer solution and accelerate clearing.

FIG. 5. MHD-accelerated antibody labeling of brain tissue. A) Image of an intact *Berghia stephanieae* pedal ganglion after passive α-serotonin antibody labeling (cyan) with tissue autofluorescence (red). B) Image of an intact *Berghia stephanieae* pedal ganglion after MHD-accelerated α-serotonin antibody labeling (cyan) with tissue autofluorescence (red). C, D) Images of a cleared zebrafish brain (3 mm×3 mm×6 mm) after α-acetylated tubulin antibody labeling (red) with tissue autofluorescence (cyan; Passive labeling: C; MHD-accelerated labeling: D). E, F) Images of cleared mouse brain sample (6 mm×6 mm×6 mm) after α-oxytocin labeling (red) with tissue autofluorescence (cyan; Passive labeling: E; MHD-accelerated labeling: F). G, H, I) MHD-accelerated labeling of adult mouse brain sample (6 mm×6 mm×6 mm) after α-vasopressin antibody labeling (cyan) with genetically encoded tdTomato in vasopressin-expressing neurons (red; AVP-cre×rosa26-lsl-tdTomato). Insets indicate the imaging plane.

DETAILED DESCRIPTION OF THE INVENTION

This invention is based in part on the disclosed novel strategy that applies a combined electrical and MHD force to rapidly move charged molecules within cleared tissue samples. This invention is particularly useful for (1) removing endogenous heterogenous molecules that obstruct light-based imaging techniques from tissue samples, and (2) introducing exogenous charged molecules (e.g., antibodies, dyes) into tissue.

Figure 1:
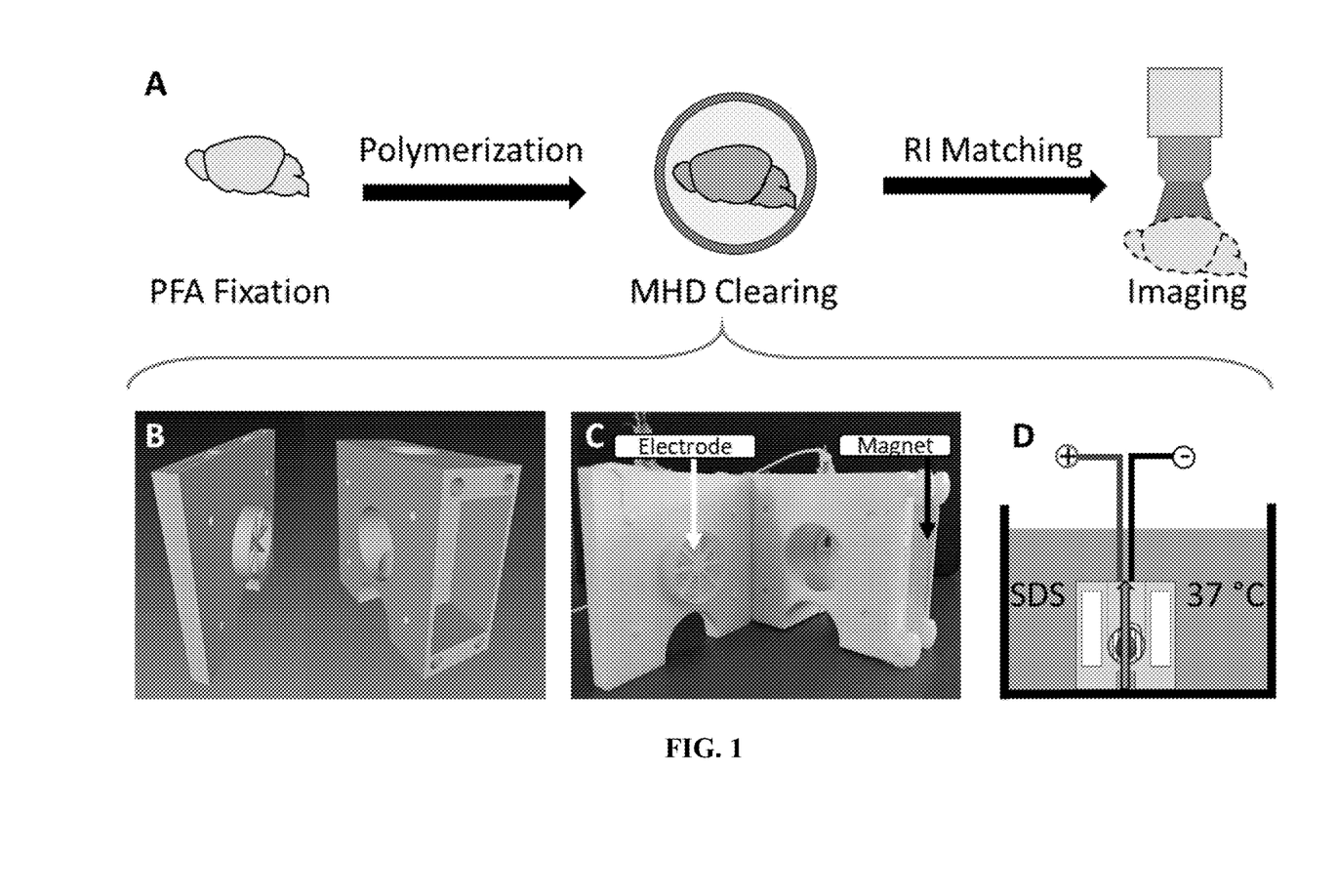

Magnetohydrodynamic forces are used to efficiently remove lipids form hydrogel-infused tissue and reliably produce transparent samples for fluorescence microscopy. MHD forces are generated when a magnetic field and an electric field are applied in perpendicular directions and propel charged molecules (e.g., lipid filled micelles or antibodies) at the intersection of these fields in the third orthogonal direction (FIG. 1). MHD forces increase the force pushing the dissolved lipids out of the tissue and simultaneously generate flow in the detergent solution. Thus, MHD-accelerated tissue clearing provides efficient thermal regulation without the need for an external pump.

MHD-accelerated tissue clearing provides direct optical access to fluorescent markers inside a large tissue sample and can also be modified to accelerate the penetration of charged molecules into tissue samples. MHD-accelerated labeling rapidly introduces targeted primary antibodies and fluorescently labeled secondary antibodies into volumes of brain tissue up to 0.22 cm$^3$ (medio-lateral: 6 mm, ventrodorsal: 6 mm, antero-posterior: 6 mm) while maintaining antigen specificity. These MHD-accelerated strategies work in both vertebrate (shown for mouse and zebrafish) and invertebrate (shown for the nudibranch mollusk *Berghia stephanieae*) species and allow an intact tissue sample to be rendered transparent, labeled with antibodies, and prepared for imaging in as few as 4 days.

The effects of the MHD conjugation on clearing and labeling of intact tissue may result from several complementary mechanisms. There is a marked increase in the flow rate through during both MHD-accelerated clearing and MHD-accelerated labeling. Because MHD forces act directly on charged molecules, buffer, lipids, and antibodies should all move within the sample more rapidly in MHD as compared with passive staining or with only an electric field. Thus, the rapid staining obtained through this protocol can be due to the direct action of MHD forces on antibodies. Alternatively, antibody penetration can be accelerated as a result of the increased speed of buffer flow, within the tissue sample, in the MHD condition. Without intending to be bound by the theories, these they are not mutually exclusive and likely both contribute to the efficacy of MHD-based approaches.

Key advantages of the disclosed devices and methods include: (1) the system is easy to build and cost-effective; (2) adaptable for use with a variety of tissues; (3) no need for an exogenous pump because the MHD force induces bulk flow around the sample to dissipate heat produced from the electrodes; (4) a built-in safeguard against tissue damage; (5) efficient clearing of biological tissue rendering it transparent while preserving endogenous proteins, and (6) efficient biomarker labeling (e.g., antibodies and vital stains) to rapidly introduce these labels into large tissue samples. This allows subsequent anatomical investigation with fluorescence microscopy. Proteins, including fluorophores (e.g., GFP) can then be imaged with subcellular resolution in large (>1 cm$^3$) samples.

Taken together, these advantages allow MHD-based approaches to remove and introduce molecules into tissue samples quickly. The efficacy of the technique has been demonstrated by clearing and labeling zebrafish, mouse, and sea slug tissue and for multiple antibodies. Taken with the linear rate of antibody penetration observed with longer durations of active labeling, the invention can be adapted for labeling larger samples with minor optimization of the strength and orientation of electrical and magnetic fields.

In one aspect, the invention generally relates to a magnetohydrodynamic system or device. The device comprises: at least one channel having space therein for holding an electrically conducting solution and a sample emerged therein; at least two electrodes creating an electric field within the channel; and a magnetic system creating a magnetic field within the channel and perpendicular to the electric field. The electric field and the magnetic field jointly induce charged particles in the sample and/or the electrically conducting solution to flow in a direction perpendicular to both the electric field and the magnetic field.

In certain embodiments, the device has one channel. In certain embodiments, the device has two channels.

In certain embodiments of the magnetohydrodynamic system or device, the at least one channel has a longitudinal dimension.

In certain embodiments, the at least two electrodes are configured such that the electric field is perpendicular to the longitudinal dimension.

In certain embodiments, the magnetic system is configured such that the magnetic field is perpendicular to the longitudinal dimension.

In certain embodiments, both the electric field and the magnetic field are perpendicular to the longitudinal dimension.

In certain embodiments, the at least one channel is cylindrically shaped.

In certain embodiments, the at least one channel has a space in the range from about 1 mL to about 100 mL (e.g., from about 1 mL to about 75 mL, from about 1 mL to about 50 mL, from about 1 mL to about 25 mL, from about 1 mL to about 10 mL, from about 1 mL to about 5 mL, from about 5 mL to about 100 mL, from about 10 mL to about 100 mL, from about 25 mL to about 100 mL, from about 50 mL to about 100 mL) in volume for holding the sample. In certain embodiments, the at least one channel has a space sufficient for holding a sample of up to 10 mL in volume. In certain embodiments, the channel has a space greater than about 2 mL in volume for holding the sample.

The channel may be made of any suitable material. In certain embodiments, the channel is made of a non-conductive material selected from nylon or acrylic.

In certain embodiments, the electrically conducting solution comprises a polar solvent and an electrolyte.

Any suitable polar solvent may be used. Suitable solvents allow for ample current, maintain the buffered pH, and minimize the loss of fluorescence.

In certain embodiments, an aqueous solution with a high concentration of ions and detergent with a basic pH is used, achieve pH to 8.5 with NaOH. For example, the aqueous solution may include a detergent or surfactant such as Triton™ X-100, sodium dodecyl sulfate, or Tween-20 and have a pH around 8.5.

Any suitable electrolyte may be used. In certain embodiments, the electrolyte is selected from the group consisting of salts (e.g., NaCl), NaOH, LiOH, H$_3$BO$_3$ providing suitable pH buffering. In certain embodiments, the electrolyte is selected from the group consisting of NaOH, LiOH, and H$_3$BO$_3$.

In certain embodiments, the electrically conducting solution comprises a borate-based buffer. In certain embodiments, the borate-based buffer comprises sodium borate.

In certain embodiments, the sample is a tissue sample. Any suitable samples may be treated or analyzed using the devices of the invention. In certain embodiments, the sample is a tissue sample (e.g., a soft tissue sample). In certain embodiments, the tissue sample is a diseased (e.g., a cancerous tissue sample). In certain embodiments, the tissue sample is an intact tissue sample.

In certain embodiments, the tissue sample is selected from soft biological samples (e.g., brain, lungs, muscle tissues).

Any charged particles may be induced to move directionally. In certain embodiments, the electric field and the magnetic field jointly are capable of clearing endogenous charged particles from the sample. In certain embodiments, the electric field and the magnetic field jointly are capable of pushing exogenous charged particles into the sample.

In certain embodiments, the cleared endogenous charged particles are selected from lipids, nucleic acids (e.g., DNAs and RNAs), and proteins.

In certain embodiments, the exogenous charged particles are selected from lipid-filled micelles, nucleic acids (e.g., DNAs and RNAs), proteins, antibodies and chemical dyes.

In certain embodiments, the charged particles are antibodies. In certain embodiments, the antibodies are fluorescently labeled (e.g. fluorescent conjugated IgG). In certain embodiments, the charged particles are nucleic acids. In certain embodiments, the charged particles are dyes (e.g. methylene blue).

In another aspect, the invention generally relates to a method for moving charged particles in a biological sample. The method comprises: providing a sample submerged in a channel having an electrically conducting solution; applying an electric field within the channel; simultaneously applying a magnetic field within the channel and perpendicular to the electric field; and inducing the charged particles in the sample to flow in a direction perpendicular to both the electric field and the magnetic field.

In certain embodiments of the method, the electrically conducting solution comprises a polar solvent and an electrolyte.

Any suitable polar solvent may be used in the method. In certain embodiments, the polar solvent is water.

Any suitable electrolyte may be used in the method. In certain embodiments, the electrolyte is selected from the group consisting of salts (e.g., NaCl), NaOH, LiOH, H$_3$BO$_3$ providing suitable pH buffering. In certain embodiments, the electrolyte is selected from the group consisting of NaOH, LiOH, and H$_3$BO$_3$.

In certain embodiments, the electrically conducting solution comprises a borate-based buffer. In certain embodiments, the borate-based buffer comprises sodium borate.

In certain embodiments of the method, the sample is a tissue sample. Any suitable samples may be treated or analyzed using the devices of the invention. In certain embodiments, the sample is a tissue sample (e.g., a soft tissue sample). In certain embodiments, the tissue sample is a diseased (e.g., a cancerous tissue sample). In certain embodiments, the tissue sample is an intact tissue sample.

In certain embodiments, the tissue sample is selected from soft biological samples (e.g., brain, lungs, and muscle tissues).

Any charged particles may be induced to move directionally. In certain embodiments, the electric field and the magnetic field jointly are capable of clearing endogenous charged particles from the sample. In certain embodiments, the electric field and the magnetic field jointly are capable of pushing exogenous charged particles into the sample.

In certain embodiments, the cleared endogenous charged particles are selected from lipids, nucleic acids (e.g., DNAs and RNAs), and proteins.

In certain embodiments, the exogenous charged particles are selected from lipid-filled micelles, nucleic acids (e.g., DNAs and RNAs), proteins, antibodies and chemical dyes.

In certain embodiments, the charged particles are antibodies. In certain embodiments, the charged particles are nanobodies. In certain embodiments, the antibodies or nanobodies are fluorescently labeled (e.g. fluorescent conjugated IgG). In certain embodiments, the charged particles are nucleic acids. In certain embodiments, the charged particles are dyes (e.g. methylene blue).

In certain embodiments, the sample has a volume in the range from about 0.1 mL to about 10 mL (e.g., about 0.1 mL to about 5 mL, about 0.1 mL to about 2 mL, about 0.1 mL to about 1 mL, about 0.1 mL to about 0.5 mL, about 0.5 mL to about 10 mL, about 1 mL to about 10 mL, about 2 mL to about 10 mL, about 2 mL to about 5 mL).

As discussed herein, the MHD-based strategy employs an electrical force and a conjugated magnetic field to move charged molecules into and out of the tissue. The two complementary forces increase the total force produced on the charged particles, which allows more powerful as well as controlled removal of lipids and other particles from, as well as introduction of biological particles (such as labeled antibodies) into, large tissue samples.

The application of an MHD force induces bulk flow around the sample to dissipate heat produced from the electrodes, which eliminates the need for an exogenous pump. Coupling of buffer flow directly to the clearing force creates a built-in kill-switch, where thermal damage associated, for example, with pump malfunction is impossible as the flow necessary to clear tissue comes directly from the MHD force itself. Thus, the risk of damage to, often precious, tissue samples is dramatically reduced with MHD-assisted clearing. Experiments demonstrate an important distinction between tissue opacity and the ability to resolve fine structures with fluorescence microscopy. While tissue samples quickly became transparent, the ability to resolve cells microscopically, was improved with previous exposure to the clearing solution.

Together, these strategies facilitate structural investigation of large tissue samples with fluorescence microscopy.

Both the MHD clearing device and the MHD antibody staining device described here are cost-effective. Moreover, the simple modular design of these devices makes modification easy, allowing the MHD strategy to be quickly applied to different types of tissues.

This MHD-based labeling strategy allowed rapid introduction of exogenous labels into large tissue samples using a reasonable volume (e.g., 4.5 mL) and concentration of antibody in solution (e.g., 1:500 primary; 1:200 secondary).

Using the MEM labeling protocol, a single tissue sample can be maximized to yield more useful data than a comparable transgenic sample. By employing multiple stains, a researcher can maximize the data collected from each tissue, allowing more precious samples to be annotated for multiple molecular features. This allows direct comparison of molecular profiles of individual samples at the cellular level.

The MHD force may be augmented to exert as much strength as possible on the tissue. Unnecessary projections of the electric field in the clearing device have been minimized by blocking all, but the necessary electric field path with non-conductive materials (e.g., nylon, acrylic). This ensures that the full electric field strength is projected through the tissue and eliminates other possible routes between the electrodes that could siphon off field strength.

Additional forces can be produced, as shown in the following equation.

Magnetohydrodynamic Force: $F = qE + qv \times B$
F=Force on charged particle
q=Charge on the particle
E=Strength of electric field
v=Diffusive velocity of the particle
B=Strength of magnetic field The magnetic field may be isolated with non-ferromagnetic materials. By isolating the magnetic field, the magnetic field strength projected through the tissue can be maximized. This allows increased MHD force across the tissue and improve labeling efficacy. The techniques outlined here represent an advance for visualizing large, intact tissue samples. The approach outlined here provides a reliable and durable strategy to efficiently clear, and subsequently label, intact tissue.

The directionality of the label may also be addressed. As demonstrated in staining experiments there is a clear directionality of label through a sample. While this was helpful in determining the ability of fluorophores to penetrate the sample, in tissue, this could cause uneven labeling of a sample. Switching electrode polarity and/or magnetic polarity can be used to adjust and improve both the speed of penetration and consistency of labeling.

The MHD force is produced inside of the tissue, allowing consistent application of force regardless of tissue depth. Electrical and magnetic forces penetrate through the tissue as they are both waveform forces. This means that the force produced on the electromobile species in the tissue is consistent regardless of tissue depth. Other methods produce a force only on the surface of the tissue, causing the force to degrade as the species move into the tissue.

The disclosed strategy minimizes damage caused by prolonged exposure to a high voltage electric field. Prolonged exposure to high-voltage electric fields can cause tissue damage. The conjugation of the electric field with a magnetic field increases the force produced by the tissue proportional to the strength of the magnetic field. This means that a lower electrical current can be used to achieve the same force, minimizing tissue damage.

The disclosed devices are designed to be sturdy and durable. With no moving parts and full encapsulation of all vulnerable components, the device does not break down often. Other devices require substantial maintenance to function, and often break down.

The disclosed devices can also be fabricated at lower costs than the currently available alternative devices. Alternative clearing and antibody labeling techniques cost tens of thousands of dollars. Both the clearing and antibody staining devices cost less than $500 to construct.

Unlike many common clearing and labeling alternatives, the disclosed devices do not require large work area or complex setups. Both devices described are only several cubic inches in volume. This both minimizes the volume of label required and makes temperature control simple.

Yet another advantage of the devices is the fast action afforded by the unique system designs allowing both rapid clearing and staining. For example, the disclosed device allows for complete optical clarity of hydrogel infused tissue in 15 hours without passive staining and 12 hours with the addition of a 2-day passive staining step. Common clearing methods take, on average, 3 days to achieve complete optical clarity. Complete labeling of a large, intact tissue sample is also achieved in as few as 12 hours.

Furthermore, antibody in the labeling device is cycled from one end of the tissue to the other through the attached tubing. This maximizes the binding potential of the antibody solution by ensuring that any antibodies that remained unbound through a single pass across the tissue will have additional opportunities to bind.

EXAMPLES

Methods:
Tissue Fixation and Hydrogel Polymerization

Mice were euthanized and perfused with 0.01 M phosphate buffered saline (PBS) followed by 4% paraformaldehyde (PFA) in 0.01 M PBS. Tissue was then post-fixed in 4% PFA at 4° C. overnight. Next, the tissue was placed in a hydrogel solution (4% acrylamide, 4% PFA, 0.05% bis acrylamide, and 0.25% VA-044 initiator suspended in 0.01 M PBS) at 4° C. overnight. Oxygen was flushed out of hydrogel-infused tissues with at least 1 L nitrogen gas and then the samples were polymerized by incubating them at 37° C. overnight. Excess hydrogel was removed from the surface and tissue samples were transferred to PBS to flush hydrogel monomers.

Adult zebrafish were euthanized in 0.2 mg/mL tricaine mesylate (MS-222), decapitated, and the heads placed in 4% paraformaldehyde overnight. Heads were then placed in PBS and brains were carefully dissected, incubated in hydrogel at 4° C. overnight, and processed as above.

Adult nudibranchs (*Berghia stephanieae*) were anaesthetized in cold 4.5% magnesium chloride in artificial sea water for 20 minutes, pinned to a sylgard-lined dish, and fixed in 4% paraformaldehyde in sea water overnight at 4° C. Whole animals were washed with PBS and then incubated in hydrogel at 4° C. overnight and processed as above.

Active Tissue Delipidation (Clearing)

Tissue samples were incubated in SDS-clearing solution (10 mM sodium dodecyl sulfate in 0.1 M borate buffer, pH 8.5) for 2 days at 37° C. unless otherwise noted (FIG. 1A). Samples were then transferred to the MHD-accelerated clearing chamber, consisting of two interlocking cell-strainers (ThermoFisher; catalog #: 87791). The tissue chamber was placed into the central chamber of the MHD-accelerated clearing device (FIG. 1B, 1C). This holds the tissue at the intersection of the electrical and magnetic fields. The clearing chamber was submerged in a large (5 L) bath of clearing solution at 37° C. and 30 VDC (0.25 Amps) was applied across the tissue for several hours (typically 16 hours for mouse brain tissue and 2 hours for intact zebrafish brains; FIG. 1D).

Antibody Labeling

Figure 4:
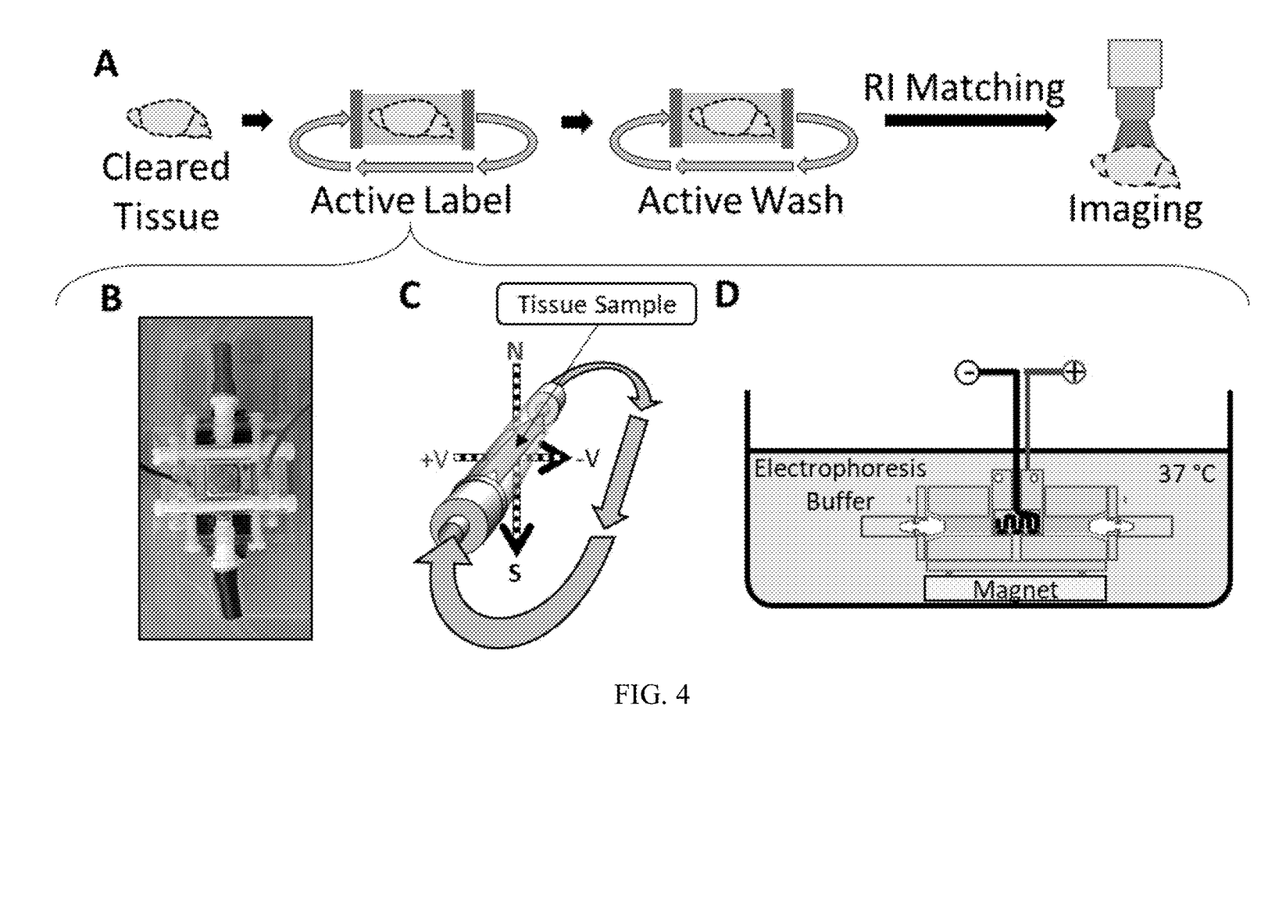
FIG. 4. MHD-accelerated antibody labeling A) Illustration of the steps required to label and image tissue. B) Picture of the MHD-assisted labeling device. C) Schematic showing the tissue location inside the MHD-assisted labeling device. The direction of the MHD force is indicated by the orange arrow inside the dialysis tubing. The resulting direction of flow of the solution through the closed loop is indicated by the blue arrows. D) Diagram of the antibody labeling device setup for a label. The device is submerged in a bath of electrophoresis buffer held at 37° C.

Delipidated tissue was placed inside of a 2-inch length of 0.25-inch diameter dialysis tubing (SpectraPor® 1; Spectrum). After equilibration the dialysis tubing was positioned in the central channel of the MHD chamber so that the tissue was at the intersection of electrical and magnetic fields (FIG. 4). Magnets (Applied magnets; NB057-6-N52) were placed on the top and bottom of the MHD labeling device creating a central chamber FIG. 4B). The ends of the dialysis tubing were connected to 9.5 mm diameter vinyl tubing (ThermoFisher: S504591) using 0.25-inch Leur lock barbs (Cole-Parmer; UX-45501-20) to create a torus-shaped chamber allowing the antibody solution to circulate continuously and provide an even and continuous source of antibody to the tissue sample (FIG. 4C). Antibody solution (4.5 mL; 0.1 M borate buffer titrated to pH 9.5 with 0.1 M LiOH, 1% heparin, 0.1% Triton™ X-100; 1:500 primary antibody) was transferred into the dialysis tubing using a 5 mL syringe. The labeling chamber was submerged in a 1 L tub containing 0.1M Borate Buffer pH 9.5/0.1% Triton X-100 solution. A 5 mL syringe filled with the buffer solution was attached to the circulation line to maintain constant pressure inside of the dialysis tube. 60 volts DC (~0.2 Amps) was applied across the electrodes for 15 minutes, followed by 3 minutes of inactivity repeatedly for 12 hours to drive antibodies into the tissue sample. The system was held at 37° C. (FIG. 4D) and protected from ambient light to minimize bleaching of fluorophores throughout the procedure.

Following each round of MHD-accelerated labeling, the antibody solution was replaced with a wash solution (0.1 M borate buffer titrated to pH 9.5 with 0.1 M LiOH, 1% heparin, 0.1% Triton™ X-100) and the tissue was exposed to 6-hours of "active washing" using the same voltage settings. Labeled tissue was then washed in 0.01 M PBS for at least 12 hours.

Refractive Index Matching and Light Sheet Microscopy

The tissue was transferred to Optiview™ refractive index matching solution and incubated at 37° C. for at least 12 hours to achieve optical clarity through RI matching (FIG. 1). Samples were imaged at 5× or 20× magnification with a lightsheet microscope adapted for a 1.45 RI imaging solution (Zeiss Z1™).

Figure 2:
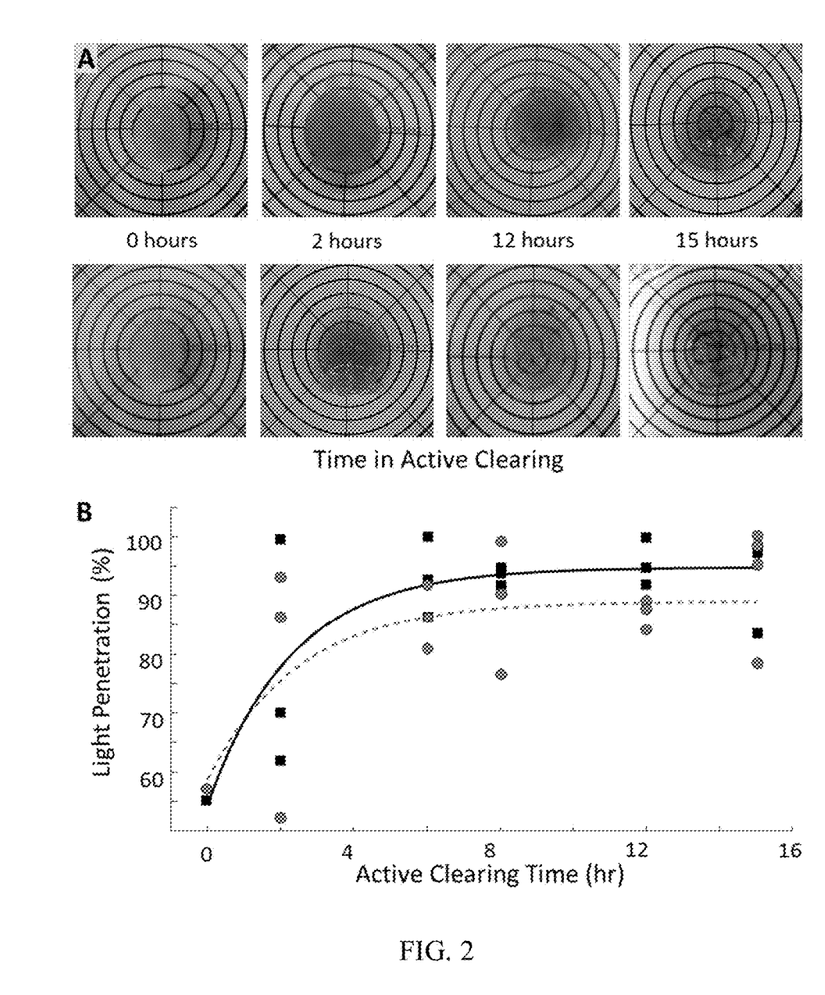
FIG. 2. MHD-accelerated clearing of the intact mouse brain. A) Representative examples of intact cleared brains actively cleared with MHD for 0, 2, 12, and 15 hours and then equilibrated in RI-matching solution. Samples in the top row were not pretreated while samples in the bottom row were incubated in clearing solution for two days prior to active clearing with MHD. B) Measurements of the optical transparency of actively cleared mouse brains. Transparency was measured as percentage wide-spectrum light penetration through the tissue (pretreated: grey circles; not pretreated: black squares; curves fit with a saturating exponential).

Measures of Clearing Efficacy 36 mouse brains were embedded in hydrogel, cleared using the MHD-accelerated clearing protocol, and assessed for transparency. The tissue was divided into two groups: one that was pretreated by passively dilapidating in SDS clearing solution for two days at 37° C. (n=18), and a second that was placed in a 0.1 M borate buffered solution at 37° C. (n=18) for the same time as the pretreatment. Tissue samples from each condition (n=3) were then actively delipidated using the MHD-accelerated clearing system for 2, 6, 8, 12, or 15 hours (FIG. 2). After washing in 0.01M PBS, the tissue was equilibrated in Optiview™ for 48 hours at 37° C.

Transparency was determined by the percentage of light transmitted through the tissue and the maximum depth from the external surface at which the morphology of neural processes (including primary dendrites and axons) could be resolved. Light transmission was measured using a wide-spectrum light-source and calibrated photodiode. Data from each condition was fit with a saturating exponential curve in MATLAB.

Genetically encoded fluorophores: Tissue was collected from mice that transgenetically expresses Cre-recombinase under the control of the aromatase promoter. Animals were then injected with a modified G-deleted rabies virus expressing GFP in the medial amygdala to identify synaptically coupled neurons.

Optimization of MHD-Accelerated Immunohistochemistry 0.22 cm$^3$ cubes of hydrogel were incubated with FITC-conjugated antibodies (1:200; Jackson Immunoresearch) with MHD assistance, with an equivalent electric field, or passively for 1 hour at 37° C. (n=1). The distance of antibody penetration from the nearest surface was measured using lightsheet microscopy as described above.

Results:

Tissue Clearing/Delipidation

The MHD-accelerated clearing technique rendered whole adult mouse brains transparent in as few as 15 hours. Lipids were actively removed from tissue samples using MHD-accelerated clearing and incubated these samples in a RI matching solution (FIG. 2A). The MHD-accelerated clearing protocol removed lipids from an adult mouse brain without passive incubation in clearing solution in 15 hours (FIG. 2A, 2B), however, pretreatment with passive incubation in SDS-containing clearing solution (37° C.) for two days prior to MHD-accelerated clearing improved optical transparency in terms of both light transmission and effective clarity. Pretreatment also reduced the amount of time required to effectively clear tissue using MHD-accelerated clearing (FIG. 2A) and typically produced better samples for imaging (FIG. 2B). Because passive delipidation was gentler on tissue and reduced the time of MHD clearing required to achieve optimal transparency, all subsequent tissue samples were passively cleared prior to active clearing.

Figure 3:
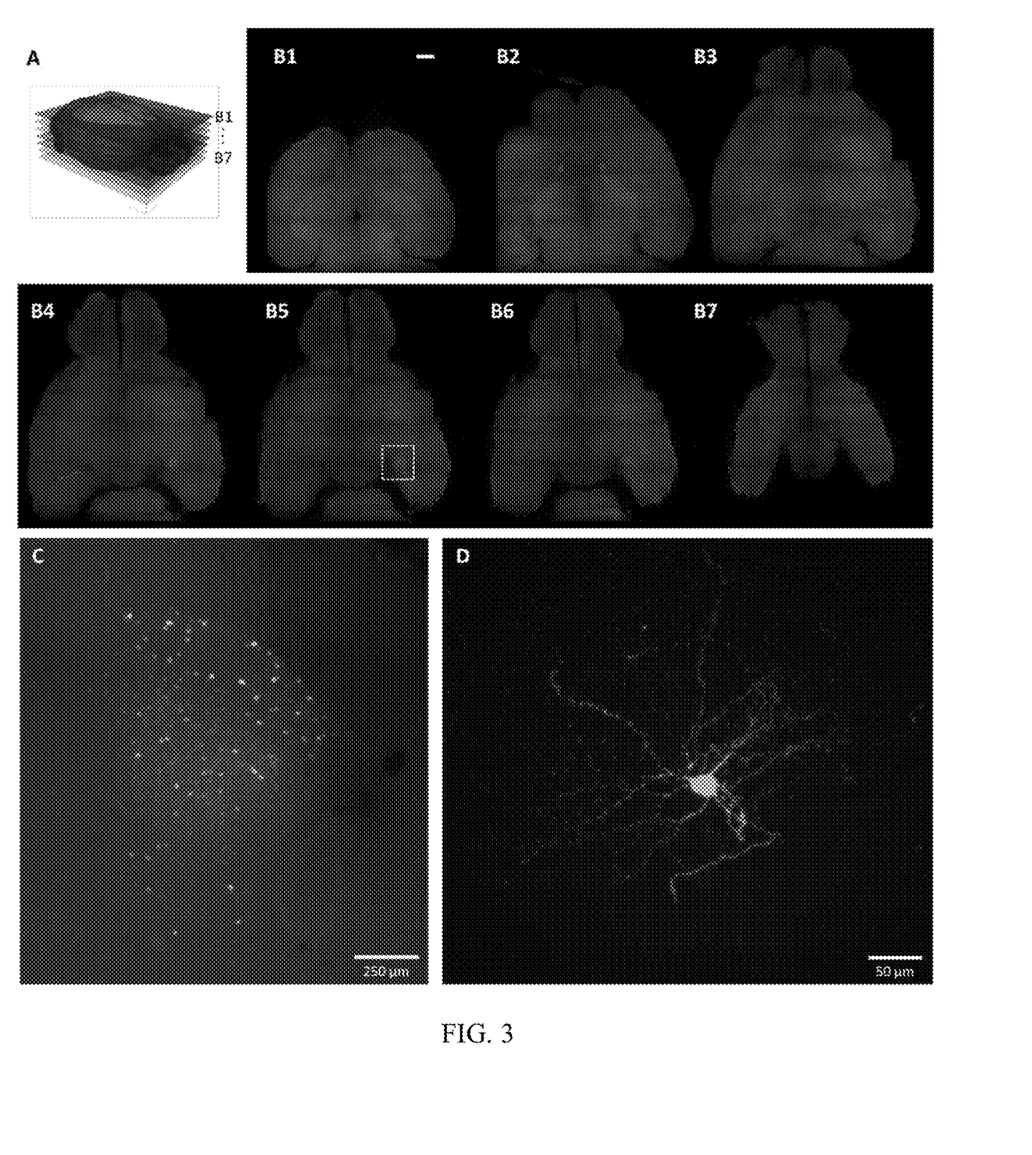
FIG. 3. Lightsheet microscopy with MHD-cleared tissue. A) Illustration showing the imaging plane of the optical slices shown in (B). B) Optical slices of an intact mouse brain cleared using MHD imaged using a Zeiss Z1™ lightsheet microscope. GFP-labeled cells are clear in the medial amygdala (cyan). C) A higher magnification image of the infection site corresponding to the location of the dashed box in B5. The image shows that individual cells are visible even at low (5×) magnification. D) A high magnification (20×) image of a single rabies infected cell in an intact mouse brain located in the PVN.

MHD-accelerated clearing reliably produced tissue samples with excellent optical transparency while also preserving genetically encoded fluorescent proteins (FIG. 3). An intact adult mouse brain was prepared using MHD-accelerated clearing and imaged on a Zeiss Z1™ lightsheet microscope. Sparse GFP cells are easily identified even in even in the center of the brain (FIG. 3B, 3C, 3D). Whole brain images resolve tissue architecture throughout the brain with subcellular resolution (FIG. 3C, 3D). Higher magnification shows that fine processes, such as dendrites and axons, can be easily identified and analyzed (FIG. 3D).

MHD-Accelerated Histology

Samples were incubated in an antibody solution inside dialysis tubing at the center of intersecting electrical and magnetic fields where the MHD force was strongest (FIG. 4). Confining the tissue sample inside dialysis tubing reduced the volume of antibody required for labeling and protected the tissue sample and antibody solution from direct exposure to the electrodes. Vinyl tubing allowed continuous circulation of the antibody during the MHD-accelerated labeling process (FIG. 4C). Initial tests with a 6 $mm^3$ hydrogel block incubated with antibody (mouse anti-rat; FITC-conjugated; 1:200 dilution; Jackson Immunoresearch; 60 volts; 1 hour) revealed two perpendicular penetration fronts with roughly 50% improvement for antibody penetration under MHD over that observed in samples exposed to electrical force only (153.8% of electrical only). The passive control showed less than 1% penetration, as compared with electrical only, over the same time (0.92% of electrical only).

MHD-accelerated labeling improves antibody penetration and allowed labeling of intact tissue samples. An intact adult nudibranch (*Berghia stephanieae*) (medio-lateral: 1.3 mm; dorso-ventral: 1.5 mm, anterio-posterior: 2 cm) that had been delipidated using the MHD-accelerated clearing device was incubated with an anti-serotonin (5-HT; Immunostar; 1:500) antibody followed by a fluorescent secondary (488 nm conjugated; ThermoFisher; 1:200). Passive antibody labeling failed to effectively reach the brain (FIG. 5A); however, MHD-accelerated antibody labeling drove antibodies throughout the sample and revealed 5-HT expressing cell bodies and projections (FIG. 5B).

Figure 5:
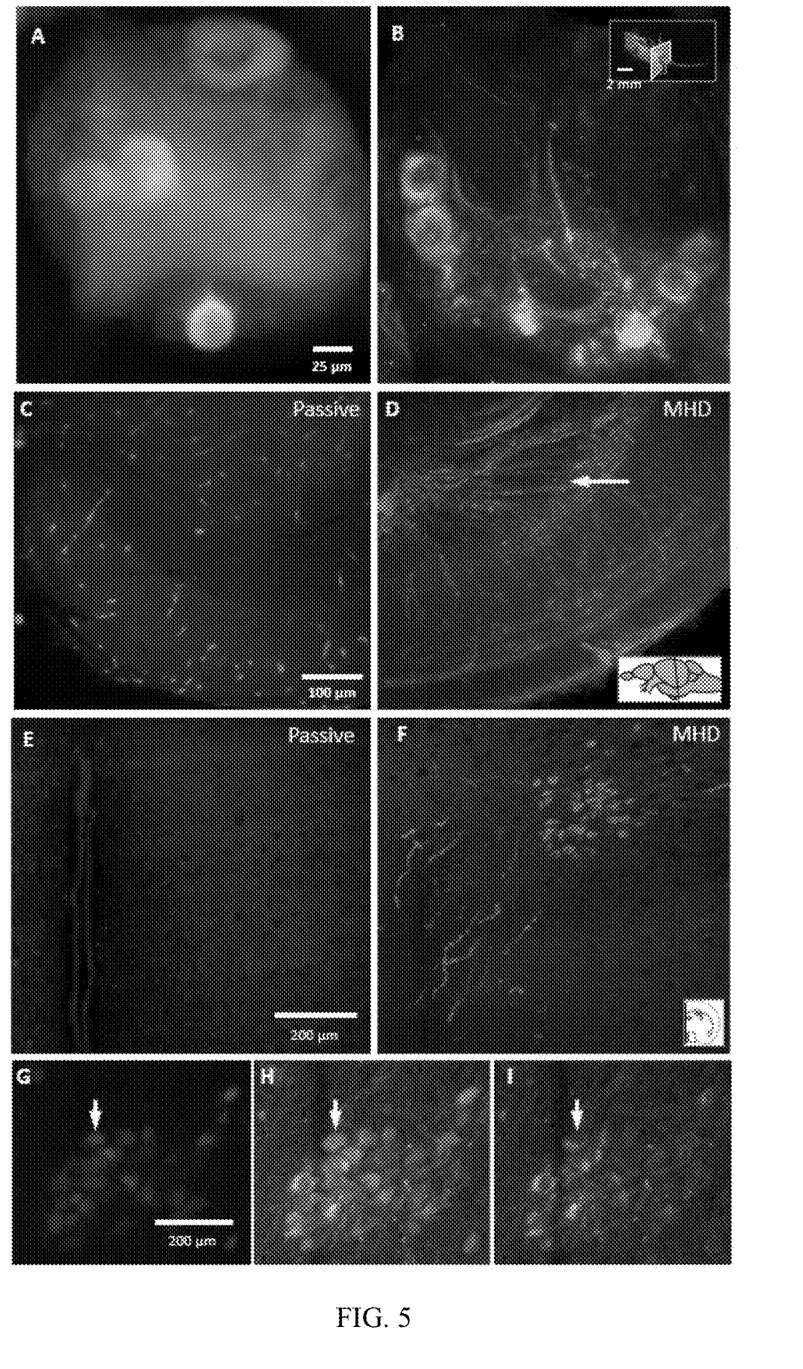

Intact zebrafish brains (medio-lateral: 3 mm; dorso-ventral: 3 mm; anterio-posterior: 6 mm) were passively delipidated in SDS for 7 days and then incubated with anti-acetylated tubulin antibodies (Immunostar; 1:500) to identify neural fibers (FIG. 5 C, 5D). Control tissue samples (no MHD force applied) showed only nominal penetration along the outer edge of the tissue and weak binding in the upper layer of the optic tectum (FIG. 5C). In contrast, MHD-accelerated labeling showed robust labeling of neural tracts throughout the brain (FIG. 5D).

To test MHD-accelerated labeling in mammalian tissue, an anti-oxytocin (OT) antibody was applied to a cube of mouse brain (medio-lateral: 6 mm, ventro-dorsal: 6 mm, antero-posterior: 6 mm) containing the PVN (1:500 primary; 1:200 secondary). Antibodies did not effectively penetrate the control tissue sample without MHD (FIG. 5E). However, OT-expressing cells were clearly visible in the PVN of tissue prepared with the MHD-accelerated labeling device (FIG. 5F). OT-expressing neurons sent processes towards the third ventricle and, consistent with OT neuron morphology, these processes were visible several mm into the tissue from the nearest edge. Moreover, it was possible to visualize subcellular components such as axonal varicosities of MHD-labeled OT neurons (FIG. 5F).

To confirm the specificity of antibody binding is maintained in MHD-accelerated labeling, an anti-vasopressin antibody in mice was used that expressed tdTomato in vasopressin-expressing neurons (FIG. 5G-5I). Tissue was generated by crossing the Ai9 Rosa26:LSL:tdTomato reporter line and a line where Cre recombinase is expressed under the control of the arginine vasopressin (AVP) promoter. This produced tissue where the fluorescent reporter tdTomato was expressed under the control of the AVP promoter. By labeling this tissue with MHD accelerated labeling, specific colabeling of the genetically encoded fluorophores and the anti-AVP antibody was observed (FIG. 5G-5I).

Figure 6:
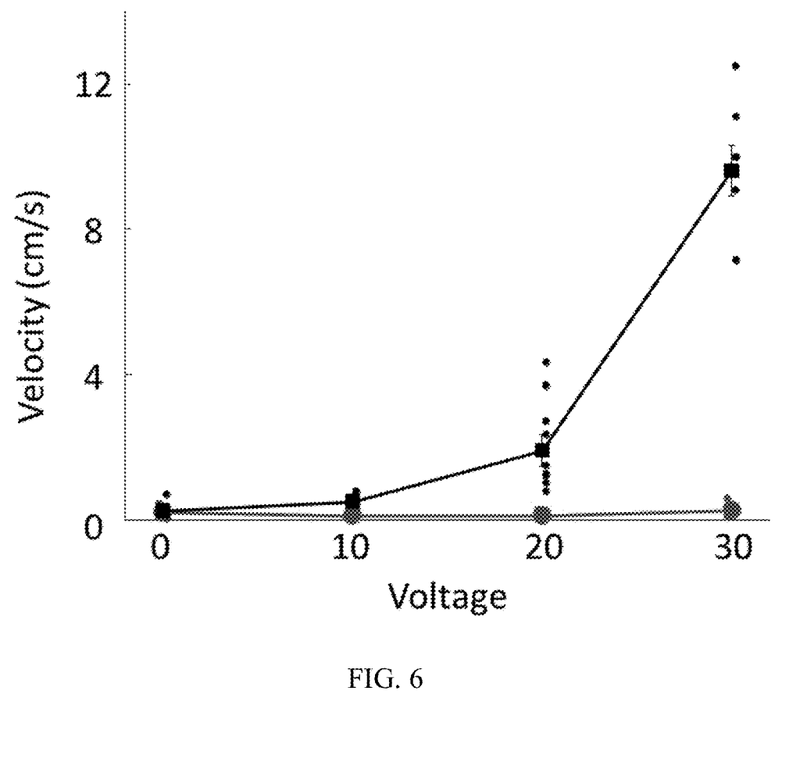
FIG. 6. Quantification of the effects of MHD force on velocity. Graph showing the velocity of sodium alginate spheres in the direction of the produced MHD force in a device producing MHD force or purely electrical force. The MHD condition is shown in black, while the electric only condition is shown in red. Error bars show the standard error of the mean. Velocities from individual orbs are represented as individual points. The MHD condition shows statistically significant increases over the range ($p<0.0001$), with the 10V, 20V, and 30V conditions each showing significance to an α-value of 0.005 ($p=0.0022$; $p=0.00049$; $p=5.6\times10-9$ respectively). The 0V condition showed no significant difference between the two conditions ($p=0.58$).

To compare the effects of MHD force versus an electric only field on solution motility, we measured the velocity of dyed sodium alginate spheres for voltages ranging from 0 to 30 volts (FIG. 6). The MHD produced a much more movement in the solution and was statistically significant from the electric field only condition for all conditions except 0 volts.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description, herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

The invention claimed is:

1. A method for tissue delipidation, comprising:
providing a whole adult mouse brain submerged in an electrically conducting solution comprising NaOH, LiOH and $H_3BO_3$, or a salt thereof, in a cylindrically shaped channel having a longitudinal dimension, wherein the whole adult mouse brain is positioned stationary to the cylindrically shaped channel; and
applying an electric field within the cylindrically shaped channel and simultaneously applying a magnetic field within the cylindrically shaped channel and perpendicular to the electric field, thereby inducing lipid particles in the whole adult mouse brain to flow in a direction perpendicular to both the electric field and the magnetic field, wherein delipidation is completed in about 15 hours,
wherein
the electrically conducting solution comprises a polar solvent and an electrolyte; and
the electric field and the magnetic field are both perpendicular to the longitudinal dimension and jointly induce charged lipid particles in the whole adult mouse brain to flow in a direction perpendicular to both the electric field and the magnetic field.

2. The method of claim 1, wherein the polar solvent is selected from the group consisting of water, methanol, ethanol, propanol and acetic acid.

3. The method of claim 2, wherein the polar solvent is water.

4. The method of claim 3, wherein the electrically conducting solution comprises sodium borate.

5. The method of claim 1, wherein the whole adult mouse brain is not pre-treated in passive incubation.

* * * * *